US012600076B2

(12) United States Patent
Obermeier et al.

(10) Patent No.: US 12,600,076 B2
(45) Date of Patent: Apr. 14, 2026

(54) METHOD FOR OPERATING A CONTAINER TREATMENT SYSTEM AND CONTAINER TREATMENT SYSTEM WITH OPTIMIZED PARAMETERS

(71) Applicant: KRONES AG, Neutraubling (DE)

(72) Inventors: Martin Obermeier, Regensburg (DE);
Thomas Philipp, Eilsbrunn (DE);
Dennis Raza, Mintraching (DE);
Daniel Vogler, Neutraubling (DE);
Markus Haller, Zeitlarn (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/065,868

(22) Filed: Oct. 8, 2020

(65) Prior Publication Data

US 2021/0101315 A1 Apr. 8, 2021

(30) Foreign Application Priority Data

Oct. 8, 2019 (DE) ..................... 10 2019 126 947.4

(51) Int. Cl.
*B29B 13/02* (2006.01)
*B29C 31/00* (2006.01)
(Continued)

(52) U.S. Cl.
CPC .............. *B29C 49/78* (2013.01); *B29B 13/02* (2013.01); *B29C 31/008* (2013.01); *B29C 49/12* (2013.01); *B29C 49/46* (2013.01); *B29C 49/6409* (2013.01)

(58) Field of Classification Search
CPC ..... B29C 49/783; B29C 49/786; B29C 49/78; B29C 31/008; B29C 49/6409;
(Continued)

(56) References Cited

U.S. PATENT DOCUMENTS

| | | | |
|---|---|---|---|
| 9,375,878 B2 * | 6/2016 | Hahn ........................ | B67B 3/26 |
| 2011/0260350 A1 | 10/2011 | Haesendonckx et al. ................... B29C 49/78 | |

(Continued)

FOREIGN PATENT DOCUMENTS

| | | | | |
|---|---|---|---|---|
| DE | 10 2008 057 999 | 5/2010 | ............. | B29C 49/04 |
| DE | 10 2016 103 117 | 8/2017 | ............. | B65B 57/00 |

(Continued)

OTHER PUBLICATIONS

Extended European Search Report issued in European Patent Appln. Serial No. 20 20 0376.0, dated Mar. 10, 2021, machine English translation, 11 pages.

*Primary Examiner* — Monica A Huson
(74) *Attorney, Agent, or Firm* — HAYES SOLOWAY P.C.

(57) ABSTRACT

A method of operating a container treatment system, wherein a plurality of parameters of the container treatment system, which are characteristic for the treatment of containers in the container treatment system, are variable and wherein the parameters are each linked to at least one value characteristic of the containers to be treated, wherein for each parameter a plurality of reference parameter values are stored in a storage device, wherein at least one characteristic value of the containers to be treated is entered at a user interface and, on the basis of this entry and the stored reference parameter values, a combination of parameter values for the parameters is calculated.

20 Claims, 3 Drawing Sheets

(51) Int. Cl.

| | |
|---|---|
| *B29C 49/12* | (2006.01) |
| *B29C 49/46* | (2006.01) |
| *B29C 49/64* | (2006.01) |
| *B29C 49/78* | (2006.01) |

(58) Field of Classification Search
CPC . B29C 49/46; B29C 2049/4635; B29C 49/12;
B29B 13/02
See application file for complete search history.

(56) References Cited

U.S. PATENT DOCUMENTS

| | | | |
|---|---|---|---|
| 2012/0226376 A1 | 9/2012 | Haesendonckx et al. | .................. G05B 15/02 |
| 2014/0298100 A1* | 10/2014 | Grimm | .................... B65C 9/40 714/37 |
| 2019/0022915 A1 | 1/2019 | Zoelfl et al. | .......... B29C 49/421 |
| 2021/0078235 A1 | 3/2021 | Kitzinger et al. | ...... B29C 49/06 |

FOREIGN PATENT DOCUMENTS

| | | | |
|---|---|---|---|
| DE | 10 2017 120 634 | 3/2019 | ............. B29C 49/64 |
| WO | WO 2011/023155 | 3/2011 | ............. B29C 49/78 |

* cited by examiner

METHOD FOR OPERATING A CONTAINER TREATMENT SYSTEM AND CONTAINER TREATMENT SYSTEM WITH OPTIMIZED PARAMETERS

BACKGROUND OF THE INVENTION

The present invention relates to a method for operating a container treatment system and a container treatment system. Such container treatment systems have been known from the state of the art for a long time. The term "container treatment system" covers a large number of different systems, such as heating systems which heat preforms, blow moulding machines which convert plastic preforms into plastic containers, labelling units, filling machines, sterilisation units and the like. A combination of several of these systems also falls under the term container treatment system.

The containers may be preforms, bottles, cans, KEGS, syringes, pouches or the like. They can be made of different materials, such as plastic, glass, metal, etc.

The invention is particularly preferred for container treatment systems, where at least plastic preforms are heated and then formed into plastic containers such as bottles.

During the treatment of containers in a container treatment system, there are a large number of variable parameters that are characteristic of the treatment. The term variable means that these parameters can change fundamentally, so they do not have to be static. The term "variable" covers both parameters that can be directly regulated (such as the heating temperature of a radiant heater) and those that cannot be influenced from the outside, or can only be influenced with a great deal of effort (such as an ambient temperature, air humidity in the production hall, etc.)

These parameters are each linked to at least one value characteristic of the containers to be treated. The value characteristic of the containers to be treated may be, on the one hand, a result to be obtained from a finished container, for example the wall thickness which the finished container should have. However, the characteristic value may also be a value which the container to be treated has before treatment, for example a wall thickness of the plastic preform before a forming operation.

A "link" between the parameters and the characteristic value of the containers exists in particular because the parameters can influence the characteristic value of the containers, or the characteristic value influences which parameters are required. For example, the wall thickness of a plastic preform determines the required heating temperature of a heater, or the wall thickness of the formed plastic container depends on the heating temperature of a heater.

In the state of the art, the container treatment systems are regulated by regulating the parameters. This has several disadvantages. On the one hand, a large part of the parameters are set statically, so that the user himself must react to certain fluctuations in the process. This leads to a lower process stability and the need for regular user intervention in case of process deviations.

Furthermore, in view of the large number of parameters, there are generally several degrees of freedom in parameterization. This means, for example, that the same result can be achieved by many different parameter combinations. It is possible that some of these parameter combinations may be considered "better" from various points of view, e.g. because they lead to lower energy consumption, increased process stability, longer life of (individual) devices, etc. Due to the large number of parameters, the user is faced with a very complex problem when selecting suitable parameters, which he may not be able to solve optimally and/or only with a lot of experience.

In addition, the user wants to handle containers with different characteristic values. In the state of the art, it is currently common practice that, for example, a separate "recipe" with suitable parameters for the heating process is stored for each type of plastic preform. If the user now wants to treat a new type of plastic preforms, a new "recipe" must be created. Such settings are currently carried out manually by process specialists and can therefore only be carried out depending on the personnel involved and with business trips to the customer's site. This in turn leads to delays in the commissioning of new grades both at the customer's site and at the system. After handover to the customer, unsuitable heating process settings may also be carried out by customer employees, which leads to increased wear and tear and thus possibly to complaints (quality costs).

The present invention is therefore based on the object to provide a device and a method by which the disadvantages mentioned above are avoided.

SUMMARY OF THE INVENTION

In a method according to the invention for operating a container treatment system, a plurality of parameters ($P_1$, $P_2$, $P_3$, . . . $P_m$) of the container treatment system, which are characteristic for the treatment of containers in the container treatment system, are variable. The parameters ($P_1$, $P_2$, $P_3$, . . . $P_m$) are each linked to at least one characteristic value (W) of the containers to be treated. For each parameter ($P_1$, $P_2$, $P_3$, . . . $P_m$) a plurality of reference parameter values ($p_{11}$, $p_{12}$, $p_{13}$, . . . $p_{1n}$, . . . $p_{m1}$, $p_{m2}$, $p_{m3}$, . . . $p_{mn}$) is stored in a storage device.

According to the invention, at least one characteristic value (W) of the containers to be treated is entered at a user interface and a combination of parameter values for at least two of the parameters is calculated on the basis of this entry and the stored reference parameter values ($p_{11}$, $p_{12}$, $p_{13}$, . . . $p_{1n}$, . . . $p_{m1}$, $p_{m2}$, $p_{m3}$, . . . $p_{mn}$).

Thus, unlike the usual state of the art, the user interface is not used to enter the parameter of a technical manipulated variable (such as the heating temperature of a radiant heater), but a value characteristic of the containers to be treated (e.g. a desired result such as bottle shape, material distribution, etc. or e.g. characteristics of the plastic preform).

The parameters are preferably variable within a given limit. Especially preferred are also the limits variable.

For illustration purposes, an example is described below in which the container treatment system has a heating device with several radiant heaters and a forming device downstream of the heating device for forming plastic preforms into plastic containers. The forming device may, for example, be a stretch blow moulding machine. However, it is also conceivable that the expansion of the plastic preforms is carried out with a liquid medium and in particular already with the liquid filling medium.

As examples of the large number of parameters, $P_1$ refers to the energy consumption of the entire system, $P_2$ to the heating temperature of a specific radiant heater, $P_3$ to the distance between the radiant heater and the plastic preform, $P_4$ to the heating time and $P_5$ to the transport speed of the plastic preforms from the heating device to the forming device. It should be noted that this is only a possible example and should not be restrictive for the invention described. In addition or instead, the parameters may also be, for example, other (transport) speeds, (electrical) current characteristics, voltage characteristics (such as a mains voltage), working characteristics (such as engine work or power consumed by the machines), pressure characteristics (e.g., the speed at which the plastic preforms are transported to the forming device), pressure characteristics (e.g., the speed at which the plastic preforms are transported from the heating device to the forming device), and so on. e.g. a filling pressure, a pre-blowing pressure, a final blowing pressure, a pressure within a container or the like), a stretching rod movement, temperature characteristics (such as a hall temperature, a filling material temperature, a motor temperature and/or a machine temperature), volume flow characteristics (which can be e.g. a filling pressure, a pre-blowing pressure, a final blowing pressure, a pressure within a container or the like), a stretching rod movement, temperature characteristics (such as a hall temperature, a filling material temperature, a motor temperature and/or a machine temperature), volume flow characteristics (which can be e.g. a filling material temperature, a filling material temperature, a motor temperature and/or a machine temperature), volume flow characteristics (which can be e.g. (such as the flow of air, water, heat, oil, chemicals and/or a product), mass flow characteristics (such as the flow of raw materials such as wheat), force values (such as thrust forces), torque characteristics, pulse characteristics, performance characteristics (such as in relation to a machine output), unit number characteristics, illuminance or the like.

In this example, the characteristic value for the containers to be treated is a wall thickness of the finished plastic container at the height of the container at which the original plastic preform was heated with the specific heater.

Parameters $P_1$-$P_5$ are linked to this value W, since the wall thickness of the finished moulded plastic container correlates with the temperature of the plastic preform during the blowing process. If a plastic preform is hotter at a certain point, the wall thickness of the plastic container becomes thinner at this point. The temperature of the plastic preform during the blow molding process can again be controlled either by the heating temperature of the heater corresponding to this point, by the heating time, by the distance of the heater from the plastic preform or by the transport speed of the heated plastic preform to the forming station. The longer the plastic preform is transported, the more it can cool down again on this transport path. The energy consumption of the entire system depends on the setting of these parameters (and numerous other factors). In any case, the energy consumption of the entire system to produce a plastic container with the desired wall thickness (for certain parameters $P_2 P_5$) can be linked to the value W.

It is also possible that parameters are linked to each other. For example, a heating temperature of the radiant heater influences the energy consumption of the system. However, the heating temperature can also have an effect on the service life of the radiant heater.

Reference parameter values may have been obtained advantageously on the basis of measurements. It may also be advantageous to obtain the reference parameter values on the basis of theoretical calculations. It is also conceivable that some of the reference parameter values were obtained by measurements and some of the reference parameter values by calculations.

A combination ($p_{1x}$, $p_{2x}$, $p_{3x}$, ... $p_{mx}$) with a characteristic value $w_x$ linked to this combination is stored. It is advantageous that "complete" combinations are stored, i.e. a value is preferably assigned to a characteristic value $w_x$ for each parameter $P_1$-$P_m$. However, it is also conceivable that only some parameters are stored. In particular, a different number of reference parameter values can be stored for individual parameters.

In the concrete example: For each of the parameters $P_1$-$P_5$ a large number of reference parameter values are stored. Measurement results, for example, can be stored advantageously. Thus, it can be advantageously stored that a temperature $p_{21}$, a distance $p_{31}$, a heating time $p_{41}$ and a transport speed $p_{51}$ has resulted in a plastic container with a wall thickness w1 and the production of this plastic container had an energy requirement of $p_{11}$. The first index of the reference parameter values here refers to the parameter to which the respective reference parameter value belongs (i.e. parameter values $p_{1x}$ in this example always refer to an energy requirement). The second index is used to differentiate between the various reference parameter values of the respective parameter. The index "x" can be seen as a placeholder for any number.

It is also advantageously stored that a temperature $p_{22}$, a distance $p_{32}$, a heating time $p_{42}$ and a transport speed $p_{52}$ resulted in a plastic container with a wall thickness $w_2$ and the production of this plastic container had an energy requirement of $p_{12}$, etc. The indices are used here exclusively for identification purposes. They are not intended to express that the respective reference parameter values must have different values. For example, the wall thickness at $w_1$ could be the same as at $w_2$, or the energy requirement $p_{11}$ could be the same as the energy requirement $p_{12}$.

In the chosen example, a desired wall thickness $w_x$ is entered at a user interface as a characteristic value for the containers to be treated. Based on this input of the value $w_x$ and on the stored reference parameter values ($p_{11}$, $p_{12}$, $p_{13}$ ... $p_{1n}$, ... $p_{51}$, $p_{52}$, $p_{53}$ ... $p_{5n}$) a combination of parameter values is calculated for at least two of the parameters $P_1$-$P_5$, i.e. at least two parameter values ($p_{1x}$, $p_{2x}$, $p_{3x}$, $p_{4x}$ or $p_{5x}$) are determined.

It is particularly preferred to calculate a parameter value ($p_{1x}$, $p_{2x}$, $p_{3x}$, ... $p_{mx}$) for each parameter ($P_1$, $P_2$, $P_3$, ... $P_m$), i.e. a "complete" combination of parameter values is determined. In the above example, this would mean that the parameter values $p_{1x}$, $p_{2x}$, $p_{3x}$, $p_{4x}$ and $p_{5x}$ would be calculated preferentially.

In an advantageous method, the calculated parameter values ($p_{1x}$, $p_{2x}$, $p_{3x}$, ... $p_{yx}$) can match stored reference parameter values. However, the calculated parameter values ($p_{1x}$, $p_{2x}$, $p_{3x}$, ... $p_{yx}$) can also take on other values which do not match any stored reference parameter values. In particular, it is advantageous that individual parameter values match stored reference parameter values, but other calculated parameter values can take on values that are not stored.

In the example: If, for example, only the reference parameter values for $p_{41}$=5 s, $p_{42}$=7 s, $p_{43}$=9 s and $p_{44}$=10 s exist for parameter $P_4$ (heating duration), values such as 4 s, 8 s, 9.5 s, 12 s etc. can also be considered as calculated parameter value $p_{4x}$, apart from these values. The calculated parameter values are therefore not limited to values that are already stored as reference parameter values.

In a preferred method, at least one parameter ($P_1$, $P_2$, $P_3$, ... $P_m$) is regulated depending on the calculation performed.

In the above example, a change in the heat output of a radiant heater, switching a radiant heater on or off, changing the position of a radiant heater, changing a transport speed, or changing a treatment duration can be made. Other examples would be e.g. the change of a blowing pressure, the change of a filling pressure, the change of a filling quantity, etc.

It is advantageous to output information based on the calculated parameters. Such information could, for example, be the display of the calculated parameter values, the lighting up of a signal lamp or similar. The output of an automatic regulation instruction to the container treatment system is also to be understood as the output of information. If it is possible, the parameters can be regulated on the basis of the information output.

The advantage is that the parameter is regulated automatically. It is advantageous that no further user input is required for regulation.

In the case of an advantageous method, at least one actual parameter value ($py_{\_ist}$) of a parameter ($P_y$) is measured during the treatment of the containers. The parameter actual value ($p_{y\_ist}$) is preferred when calculating the combination of parameter values.

In a further preferred method, the combination of parameter values ($p_{1x}$, $p_{2x}$, $p_{3x}$ . . . $p_{mx}$) is calculated on the basis of the characteristic value (W) entered at the user interface, taking into account the parameter actual value ($p_{y\_ist}$) as a fixed parameter value.

In this way, depending on a measured actual parameter value, appropriate regulation is possible during system operation. This enables a flexible reaction to process fluctuations.

It is advantageous to measure the actual parameter value continuously during system operation. The parameter actual value can also preferably be measured at certain, particularly regular intervals during system operation.

Preferably, a (re-)calculation of the combination of parameter values is carried out continuously, at certain intervals and/or when a certain threshold value is exceeded during system operation, taking into account the parameter actual value ($_{py\_ist}$).

With an advantageous method, at least one parameter is regulated depending on such a (re)calculation. It is advantageous if regulation can be carried out continuously, at certain intervals and/or if a predetermined threshold value is exceeded.

For example, parameter $P_6$ can be a parameter for the ambient temperature. During system operation, the ambient temperature can be measured continuously or at regular intervals ($p_{6\_ist}$). Depending on the characteristic value W entered by the user (for example, the desired wall thickness of the finished vessel), a combination of parameter values is calculated. For this calculation, the measured value $p_{6\_ist}$ is taken into account as a fixed value which cannot be changed. Thus, a combination of parameter values is searched for during the calculation, how a container with the corresponding wall thickness can be produced at this (new) ambient temperature (e.g. calculation which (new) heat output the radiant heaters require, which (new) distance they should have to the plastic preform, etc.)

With a preferred process, it is possible to adjust the system. This is particularly advantageous when the system is commissioned. For this purpose it is advantageous to treat containers with preset parameters first. The process parameters are now changed and vessels are then treated again. In this way, several vessels with slightly different parameters are treated. The treated vessels are each compared with a target result. It should be noted that the machine is preferably adjusted iteratively, i.e. a large number of containers are treated in order to finally achieve the desired target result. Preferably, the process parameters are adjusted by an algorithm until a target condition is reached.

If, for example, the ambient temperature $p_{6\_ist}$ increases, a lower value is calculated when recalculating the combination of parameter values, for example for parameter $P_2$ (heating temperature of a radiant heater). Preferably, the new combination of parameter values is calculated either continuously or at certain time intervals and/or when a certain threshold value is exceeded. For example, a new combination of parameter values can be calculated at intervals of 10 minutes, but additionally also if the ambient temperature has changed by more than 0.2° C. since the last measurement.

One advantageous method uses AI (artificial intelligence) to calculate the combination of parameters. An artificial neural network is particularly preferred. Preferably an artificial neural network is used, which has been trained by means of supervised learning in order to teach the system the desired adjustments in case of process fluctuations. Here a concrete result for the different input possibilities is given. Based on the constant compreform between target and actual result, the network learns to link the neurons appropriately. However, it would also be possible to train the artificial neural network by means of unsupervised learning, reinforcing learning or stochastic learning.

With a further preferred method, an optimization for at least one parameter ($P_1$, $P_2$, $P_3$, . . . $P_m$) is possible when calculating the combination of parameter values ($p_{1x}$, $p_{2x}$, $p_{3x}$, . . . $p_{mx}$).

In order to achieve the characteristic value W, several parameter value combinations can be possible. With regard to at least one parameter, an additional optimization should be carried out so that the combination in which at least one parameter is "optimized" is selected from the combinations that are basically available. Optimised" can be understood here, for example, as meaning that the parameter value belonging to the parameter should be as low or as high as possible. It can also be understood that the parameter value is of a certain order of magnitude.

In the example already described, in which parameter $P_1$ represents the energy consumption, for example, a particularly energy-saving setting can be sought with which the characteristic value W can still be achieved. In order to achieve the desired wall thickness in the finished container, the plastic preform must have a certain temperature at this point during blow molding. To achieve a higher temperature, either the heating power of a heater can be increased (i.e. $P_2$ can be increased), the distance between heater and plastic preform can be decreased (i.e. $P_3$ can be decreased), the heating time ($P_4$) can be increased and/or the transport speed ($P_5$) between heater and forming device can be increased so that the plastic preforms have less time to cool down on their way. In the case of an advantageous method, a calculation is made in which combination of parameters ($P_1$, $P_2$, $P_3$, $P_4$, $P_5$) W is achieved, but $P_1$ is as low as possible.

The choice of parameters can also depend on the user's evaluation, for example whether a particularly low energy consumption should be preferred or the service life of machine elements.

Preferably, the optimization is done by means of combinatorial optimization. Heuristic methods are particularly preferred. Therefore, it is especially suggested to develop a heuristic for a concrete optimization problem with which an optimal solution can be found.

This has the advantage that the process parameters can always be set optimally (according to the optimization goals) and even inexperienced users can set an optimal process. In general, this also leads to a reduction in energy consumption, an increase in the service life of the individual components (e.g. the radiant heater) and an increase in process stability.

In an advantageous method, an upper and/or lower limit for a parameter value ($p_{1x}$, $p_{2x}$, $p_{3x}$, . . . $p_{mx}$) to be calculated is specified for at least one parameter ($P_1$, $P_2$, $P_3$, . . . $P_m$). In the case of a preferred method, values of the upper and/or lower limits may be stored in the storage device and/or entered via the user interface. In particular, it is also conceivable that values stored in the storage device can be changed via the user interface. For example, it is conceivable that preset limit values can be further restricted via the user interface.

For example, for the heating temperature of the radiant heater ($P_2$), the temperature actually achievable by the specific radiant heater model can be entered as the upper/lower limit. It is preferably also possible to change such a limit manually via the user interface. This can be advantageous, for example, if plastic preforms are used for which a certain temperature is not to be exceeded although the radiant heaters are basically capable of doing so.

In a further preferred method, a fault tolerance is specified for the characteristic value. In such a method, it is therefore also possible that combinations of parameter values are calculated which do not exactly match the characteristic value W, but only within a certain error.

In the example case where the characteristic value W stands for the wall thickness to be achieved in a finished container, it can be specified, for example, that when calculating a possible/optimum parameter combination, not only those parameter combinations should be taken into account where the value W is exactly achieved, but also those combinations where the wall thickness deviates from the characteristic value by a certain amount. Fuzzy logic can be used here, for example.

In this way it can be achieved that under certain circumstances, with only a small deviation from the desired result (within the range of the specified error tolerance), a significantly "optimized" result can be found. For example, it would be possible to find out in this way if the production of a container whose wall thickness deviates from the actually desired result by only a few percent requires much less energy.

For an advantageous method, the fault tolerance can either already have been stored in the storage device and/or the fault tolerance can be entered via the user interface.

In a further preferred method, a combination of parameter values ($p_{1x}$, $p_{2x}$, $p_{3x}$, . . . $p_{mx}$) is calculated on the basis of the stored reference parameter values ($p_{11}$, $p_{12}$, $p_{13}$ . . . $p_{1n}$, . . . $p_{m1}$, $p_{m2}$, $p_{m3}$, . . . $p_{mn}$), with which the characteristic value (W) is hit as accurately as possible.

This is particularly advantageous if no data material is yet available for the characteristic value W, for example if the characteristic value is an indication of a previously unknown plastic preform or an unknown finished bottle shape. In such a case, the stored reference parameter values may not provide sufficient information on how W can be reached exactly or how W can be reached safely. In this case an optimization should be carried out so that W is likely to be reached as well as possible.

For example, if a customer wants to use new plastic preforms, he does not have to set the exact process parameters, but only characteristic values of the plastic preform. In addition, further process parameters can be fixed, such as a measured ambient temperature, a bottle temperature, etc.

On the basis of stored reference parameter values, which have been measured, for example, on a large number of other, different plastic preforms, the data entered can be compared with the existing samples and a highly probable proposal for suitable process parameters can be made.

Preferably, the process is self-regulated on the basis of bottle data. Artificial intelligence is used to advantage. A data mining approach is advantageously used here. Cluster, correlation and regression analyses, for example, can be used to examine the data for correlations. A deep learning approach can also be used to learn valid combinations. In particular, an artificial neural network can be used. Heuristic methods can be used to calculate suitable combinations.

Preferably, a database or archive of the storage device is accessed during the calculation, in which valid combinations of parameter values are stored. For example, a database may exist with valid combinations of heating parameters and grade variables that can be used for a data mining approach to derive rules for automatic optimization.

In the case of an advantageous method, the calculated combination of parameter values ($p_{1x}$, $p_{2x}$, $p_{3x}$, . . . $p_{mx}$) is stored in the storage device together with the characteristic value. It is advantageous that these calculated and stored parameter values are taken into account as reference parameter values in future calculations.

In order to expand a data base and thus enable even more precise calculations, newly calculated combinations of parameter values are stored together with the corresponding characteristic value W. If, for example, a customer calculates a new recipe for new plastic preforms, this new recipe is stored in the storage device with information about these new plastic preforms. In this way, this exact recipe can be accessed later. This may also be possible for other customers via a cloud. On the other hand, this new recipe can be taken into account in further calculations for the next type of plastic preforms. In this way, even more precise calculations can be made under certain circumstances than would only be possible with the reference parameter values already stored in the beginning.

With an advantageous method it is also possible to change the calculated parameter values via a user interface. This is useful, for example, if the calculated combination of parameter values does not appear to be completely optimal. In such a case the parameter values can preferably be changed manually.

Preferably, manually changed parameter values can also be stored in the storage device. These manually changed parameter values can also be considered as reference parameter values for new calculations.

It is therefore advantageous that recipes and parameters of container treatment system are stored in the storage device in the delivery condition and that these recipes and parameters can be changed by a customer in case of modifications. Preferably, the parameters changed by the customer are additionally stored in the storage device. However, it would also be possible to update already existing parameter values, i.e. in particular that the original values are deleted and only the new values are stored. Preferably, it is possible to store in the storage device whether the parameter values are "original" parameter values or whether they are changed parameter values. When calculating parameter values, it is advantageous that "original" parameter values can be considered in a different way than changed parameter values.

The present invention is further directed towards a container treatment system with at least one device for treating containers, wherein a plurality of parameters ($P_1$, $P_2$, $P_3$, . . . $P_m$) which are characteristic for the treatment of containers in the container treatment system are assigned to the container treatment system, wherein the parameters ($P_1$, $P_2$, $P_3$, . . . $P_m$) are variable and are linked to at least one value (W) characteristic of the containers to be treated, the container treatment installation being connectable to a memory device in which a plurality of reference parameter values ($p_{11}$, $p_{12}$, $p_{13}$, . . . $P_m$) are stored for each parameter ($P_1$, $P_2$, $P_3$, . . . $P_m$) . . . $p_{1n}$, . . . $p_{m1}$, $p_{m2}$, $p_{m3}$ . . . $p_{mn}$) are stored for each parameter ($P_1$, $P_2$, $P_3$, . . . $P_m$).

In accordance with the invention, the container treatment system is assigned a user interface at which at least one value (W) characteristic of the containers to be treated can be entered, whereby on the basis of this input and the stored reference parameter values ($p_{11}$, $p_{12}$, $p_{13}$ · · · $p_{1n}$, · · · $p_{m1}$, $p_{m2}$, $p_{m3}$ · · · $p_{mn}$) a combination of parameter values ($p_{1x}$, $p_{2x}$, $p_{3x}$, . . . $p_{mx}$) can be calculated for at least two of the parameters ($P_1$, $P_2$, $P_3$, . . . $P_m$).

In particular, this described device is set up and intended to perform the above described methods, i.e. that all features performed for the above described method are also revealed for the container handling equipment described here and vice versa.

It may be advantageous to have a permanent connection between the container treatment system and the storage facility. However, it is also conceivable that it is only a temporary connection. This connection can, for example, only exist for calculating the parameter value combinations.

The connection can be a wired connection, but especially a wireless connection.

It is advantageous if the storage facility can be connected to several container treatment systems. The storage facility can be connected to container treatment systems at different locations. A cloud storage facility may be preferred.

Preferably, the container treatment system is connected to an arithmetic unit which performs the calculation of the combination of parameter values. This calculation unit can be connected locally to the container handling facility. However, the calculation unit is preferably connected wirelessly to the container handling system. A central processing unit is connected to several container handling systems.

In a further advantageous embodiment, the container treatment system has at least one sensor device. Preferably, the container treatment system has a large number of sensor devices. The at least one sensor device can be used to record parameter values for at least one parameter.

Preferably, the at least one sensor device can be used to record parameter values that can serve as reference parameter values. It is advantageous to record an actual parameter value during the treatment with the at least one sensor device. It is advantageous to be able to record both reference parameter values and an actual parameter value with the at least one sensor device for a parameter. Preferably, an actual parameter value measured by a sensor device can be stored in the storage device, and this stored actual parameter value can preferably serve as a reference parameter value in a next calculation.

In a further advantageous embodiment, the sensor devices, may include, but are not limited to, cameras, light barriers, motion sensors, temperature sensors, pressure sensors, location sensors and/or other sensors or sensor devices suitable for performing monitoring tasks.

A preferred type of container treatment system is a heating system which heats preforms, forming equipment, in particular blow moulding machines which form plastic preforms into plastic containers, labelling units, filling machines, sterilisation units or similar. A combination of these systems can also be advantageous.

It is advantageous for a heating system to have several heating elements. Preferably, the plastic preforms are fed through the heating system by means of a transport device and heated with a multitude of heating elements. The heating elements are arranged one after the other along the transport route. Advantageously, one heating element can have several radiant heaters. These radiant heaters are preferably arranged in a row one above the other, i.e. in the longitudinal direction of the plastic preforms. The radiant heaters can be infrared heaters in particular. It is advantageous if each radiant heater is an elongated heater (infrared tube), the length of which extends in the transport direction of the plastic preforms. It is advantageous that the individual radiant heaters can be controlled separately. Preferably, the temperature of each heater can be adjusted independently. It is advantageous that the heaters can be moved in the direction of the plastic preforms. Preferably, the heating system has a setting mechanism with which a heating element can be moved in the direction of the plastic preforms. The heating elements can preferably be moved independently of each other.

The container treatment system can be advantageously equipped with a device for forming plastic preforms into plastic containers or have such a device. The device for forming plastic preforms into plastic containers is preferably a blow moulding device or a blow station. In an advantageous design, a large number of such blow moulding devices are arranged on a common movable carrier. This carrier is in particular a rotatable carrier. It is advantageous to have a large number of such blow mold arrangements within a blow molding machine, and especially preferably within a stretch blow molding machine. This means that the plastic preforms are expanded to the plastic containers by the application of compressed air. For this purpose, the device preferably has a blow nozzle which can be placed against a mouth of the plastic preforms in order to apply blow air to the plastic preforms or to expand them by means of blow air. In addition, a valve arrangement is preferably also provided which controls the supply of the blowing air to the plastic preforms.

In a further advantageous embodiment, the blow molding equipment or blow stations each have stretching rods which stretch the plastic preforms in their longitudinal direction. The blow molding machine or the carrier and the blow mold arrangements are arranged within a clean room, which separates the blow molding machine from a non-sterile environment. Drive devices for closing, locking and/or opening the blow molds are preferably located outside the clean room.

The blow molding equipment is preferably transported within the clean room, whereby the clean room is preferably limited by several walls. Preferably, the clean room is bounded by at least one upright wall and one wall moving opposite this upright wall. For example, the carrier on which the blow molds are arranged may already have or form one of these walls and in particular the moving wall. The clean room separates the blow molds from a non-sterile environment.

Further advantages and embodiments will be apparent from the attached figures:

BRIEF DESCRIPTION OF THE DRAWINGS

It is shown.

DETAILED DESCRIPTION OF THE INVENTION

Figure 1:
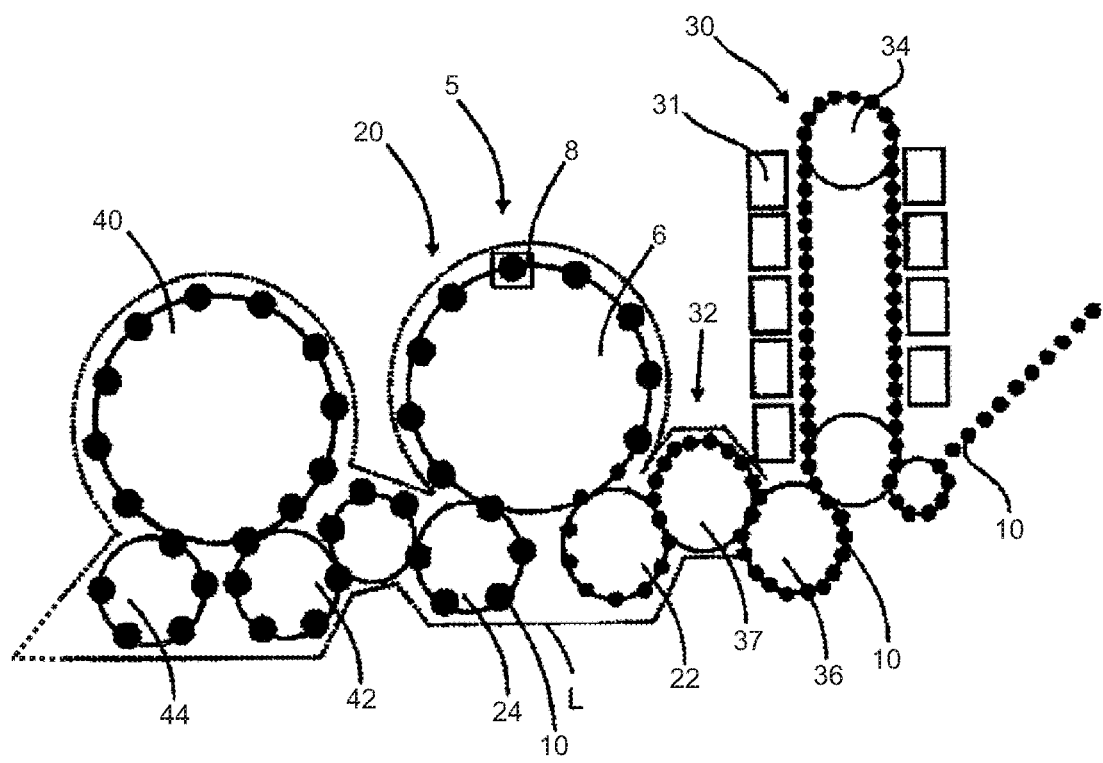
FIG. 1 Typical container treatment systems according to the state of the art.

FIG. 1 shows typical container treatment systems and their typical arrangement to each other. The container treatment system refers to the entire system as well as to the individual container treatment systems such as furnace, forming devices etc. FIG. 1 shows a heating device 30 in which plastic preforms 10 are heated. These plastic preforms 10 are fed through this heating device 30 by means of a transport device 34, as here a circulating chain, and heated by a multitude of heating elements 31. This heating device 30 is followed by a transfer unit 36, which transfers the preforms 10 to a sterilizing device 32. This sterilizing unit 32 also has a transport wheel 37 and sterilizing elements can be arranged on this transport wheel 37 or even stationary. In this area, sterilization by hydrogen peroxide gas or by electromagnetic radiation is possible, for example. Especially an internal sterilization of the preforms is carried out in this area.

The reference mark 20 indicates in its entirety a clean room, the outer boundaries of which are indicated here by the dotted line L.

The reference sign 5 indicates in its entirety a forming device in which a plurality of blowing stations or forming stations 8 are arranged on a transport wheel 6, whereby only one of these blowing stations 8 is shown here. With these blowing stations 8 the plastic preforms 10 are expanded to containers 10. Although not shown in detail here, not the entire area of the transport device 6 is located within the clean room 20, so it would be possible for the clean room to have a channel-like design at least in the area of the forming device 1.

The reference mark 22 refers to a feeding device which transfers the preforms to the forming device 5 and the reference mark 24 refers to a discharge device which discharges the produced plastic containers 10 from the forming device 5.

With a transfer unit 42 the expanded plastic containers are transferred to a filling unit 40 and from this filling unit 40 they are then discharged by a further transport unit 44.

Figure 2:
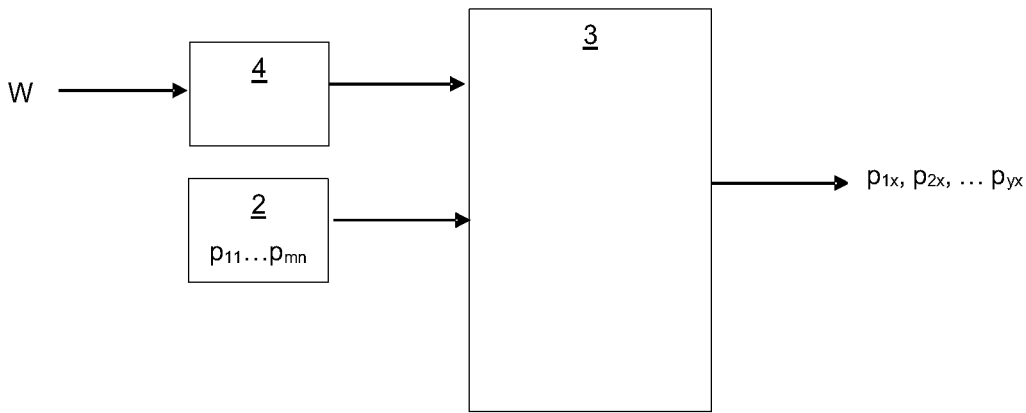
FIG. 2 a schematic illustration of a method according to the invention.

FIG. 2 schematically shows a method according to the invention. A characteristic value W for a container to be treated is transferred to the computing unit 3 via a user interface 4. A large number of reference parameter values $(p_{11}, p_{12}, p_{13}, \ldots p_{1n}, \ldots p_{m1}, p_{m2}, p_{m3}, \ldots p_{mn})$ are stored in storage device 2 for the parameters $(P_1, P_2, P_3, \ldots P_m)$. On the basis of these reference parameter values and the user input, computer unit 3 calculates a combination of parameter values $(p_{1x}, p_{2x}, p_{3x}, \ldots p_{yx})$ for at least two of the parameters $(P_1, P_2, P_3, \ldots P_m)$. The parameters can be output via an output unit.

Figure 3:
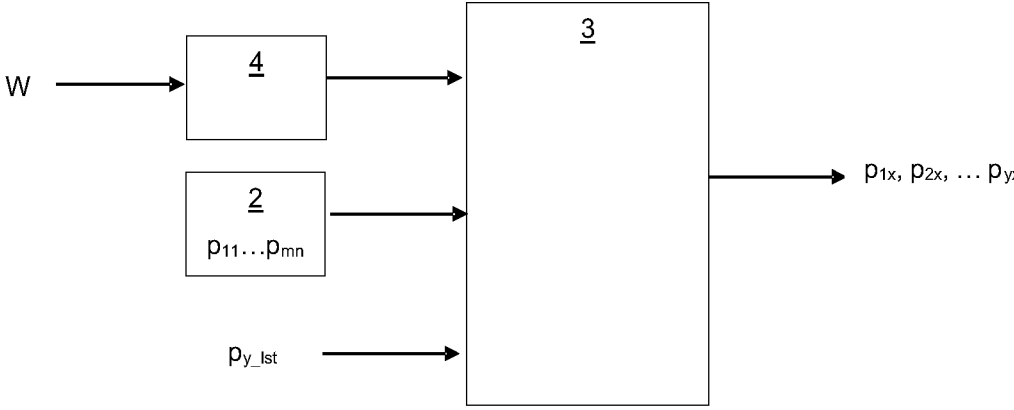
FIG. 3 a schematic illustration of an advantageous method for reacting to process fluctuations.

In FIG. 3, the arithmetic unit is also transferred an actual parameter value $p_{y\_ist}$, which is taken into account when calculating the combination of parameter values $(p_{1x}, p_{2x}, p_{3x}, \ldots p_{yx})$.

Figure 4:
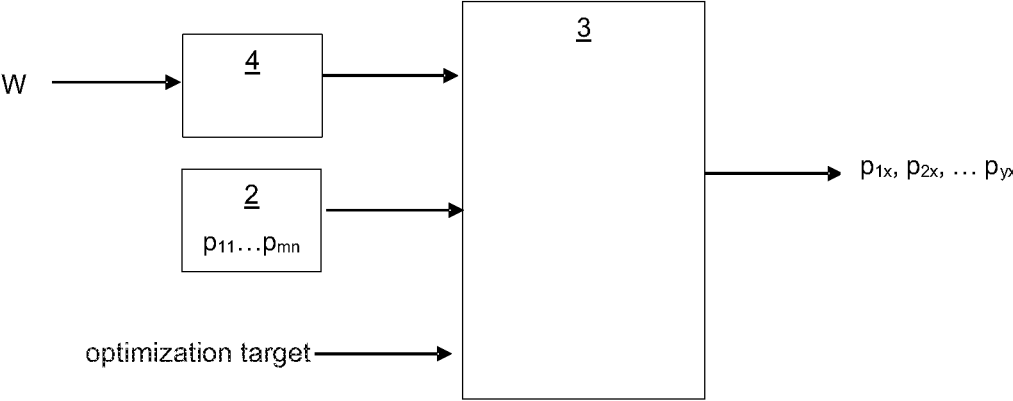
FIG. 4 a schematic illustration of an advantageous method for the optimization of parameters.

In FIG. 4 it is shown that an optimization target can also be transferred to the arithmetic unit (for example, that parameter $P_1$ should be as low as possible). In such a case, a combination of parameter values $(p_{1x}, p_{2x}, p_{3x}, \ldots p_{yx})$ is calculated with which this optimization goal can be achieved as well as possible.

Figure 5:
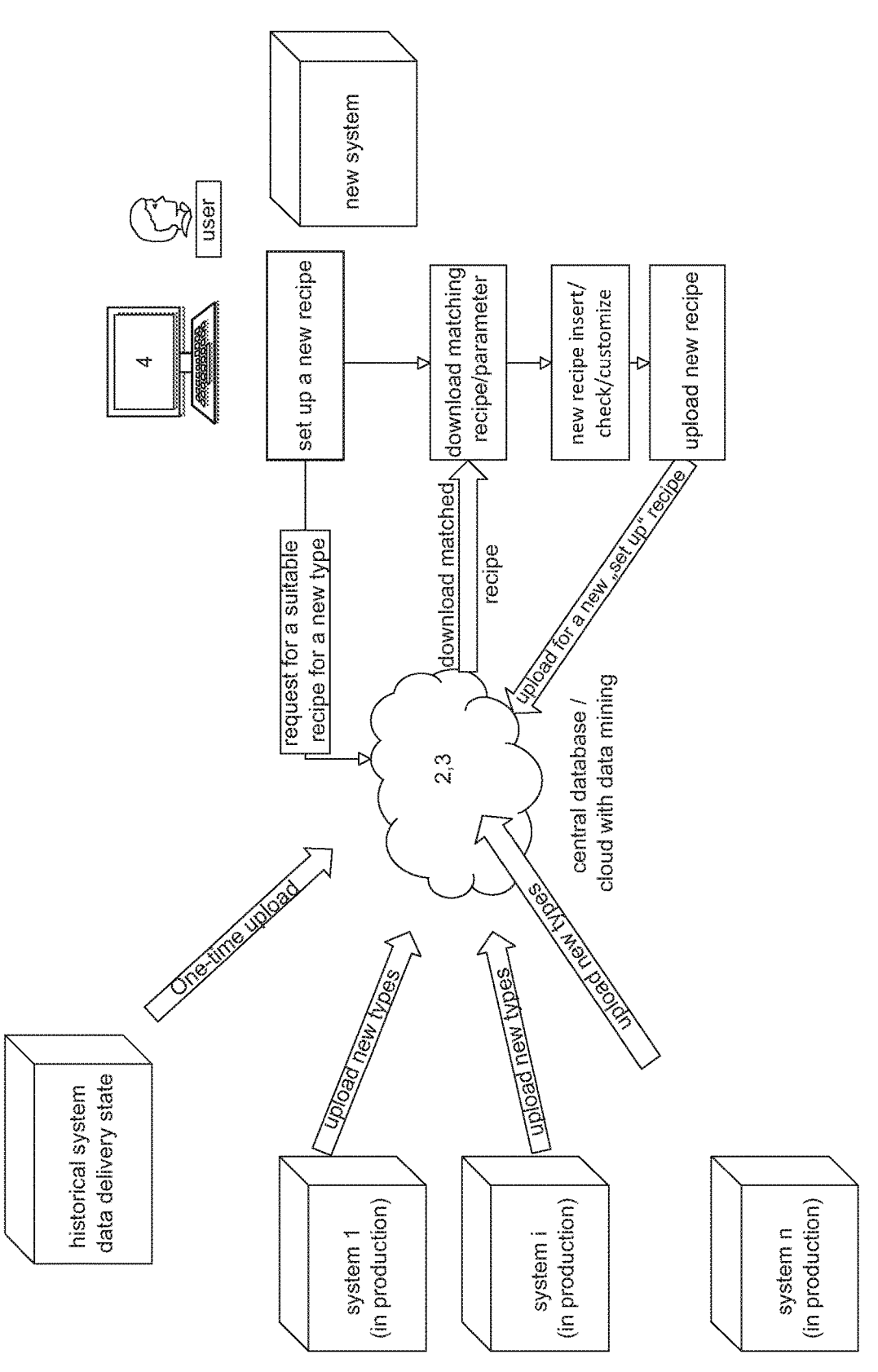
FIG. 5 schematic illustration of an advantageous method for setting up new container types.

FIG. 5 shows a schematic representation of an advantageous method for setting up new container types. The large number of reference parameter values $(p_{11}, p_{12}, p_{13} \ldots p_{1n}, \ldots p_{m1}, p_{m2}, p_{m3}, \ldots p_{mn})$ are stored in a storage device 2 (central database/cloud). For this purpose, historical system data, as they are preset in the delivery state, can be loaded once into the storage device. In addition, the individual systems (also possible for several systems 1 to n) can load further reference parameter values into the storage device. This is particularly advantageous if new types are treated in a system. If a user wants to set up a new container type (e.g. in a new system), he can send a request for a suitable "recipe" (i.e. a combination of parameter values) for the new type to storage device 2 via user interface 4.

A suitable combination of parameter values is calculated with the help of a calculation unit 3. This "matched" recipe can be downloaded from the central database/cloud and made available in the system.

This new recipe can then be checked in the system. If the calculated parameter values turn out to be not completely optimal in practice, they can be adjusted manually. The checked and, if necessary, manually modified recipe can then be loaded into the central database/cloud, so that further reference parameter values are available there.

LIST OF REFERENCE SIGNS

1 container treatment system
2 storage device
3 unit of account
4 user interface
5 forming device
6 transport wheel
8 forming stations
10 containers
20 clean room
22 feeding device
24 discharge device
30 heating device
31 heating elements
32 sterilization facility
34 transport equipment
36 transfer unit
37 transport wheel
40 filling device
42 transfer unit
44 transport unit
L line (clean room)
$P_1 \ldots \ldots$ parameters
$p_{11} \ldots$ parameter value
$p_{y\_ist}$ parameter actual value
The invention claimed is:

1. A method of operating a container treatment system using optimized and automatically regulated parameters, the method comprising:

providing a container treatment system, the container treatment system having a plurality of parameters of physical operation for treating containers with at least one container treating device, wherein the plurality of parameters is variable, the container treatment system having a non-transitory data storage device and a computer with at least one user interface;

storing, on the non-transitory data storage device, a plurality of reference values for each of the plurality of parameters, wherein the reference values are numerical values derived from measurement or calculation, and relate to at least one of an energy consumption, a temperature, a distance, a heating time or a transport speed of the physical operation for treating containers;

entering, by a user at the user interface of the computer, at least one characteristic value of containers to be treated by the container treatment system, wherein the characteristic value corresponds to a desired physical result of the containers achieved from treatment thereof;

outputting, based on the entered characteristic value, an automatic instruction to the container treatment system to perform the treatment operation on the containers to achieve the entered characteristic value of the containers, wherein the automatic instruction to the container treatment system is based on a combination of the plurality of parameters and the plurality of reference values to achieve the entered characteristic value; and performing the treatment operation on the containers with the container treatment system.

2. The method of claim 1, wherein the plurality of parameters of physical operation for treating containers further comprise at least one of: an energy consumption, a heating temperature, a distance, a heating time, or a transport speed.

3. The method of claim 1, wherein the at least one characteristic value of containers to be treated further comprises at least one of: a container shape, a container wall thickness, or a material distribution.

4. The method of claim 1, wherein the combination of the plurality of parameters and the plurality of reference values is calculated with an arithmetic unit of the computer.

5. The method of claim 1, wherein during performance of the treatment operation of the containers, at least one of the plurality of reference values is measured.

6. The method of claim 5, wherein the measured at least one of the plurality of reference values is a fixed reference value.

7. The method of claim 1, wherein for at least one parameter of the plurality of parameters, at least one of an upper limit or a lower limit is specified for a reference values.

8. The method of claim 1, wherein the containers further comprise at least one of: preforms, bottles, cans, KEGS, syringes, or pouches.

9. The method of claim 1, wherein the containers are constructed from at least one of: plastic, glass, or metal.

10. The method of claim 1, wherein the at least one container treating device further comprises at least one of: a heating device, a forming device, a transport device, a drive device, a sterilizing device, a feeding device, a discharge device, or a filling device.

11. A container treatment system having a plurality of parameters of physical operation for treating containers, wherein the plurality of parameters is variable, the container treatment system comprising:

at least one container treating device;

a computer with a non-transitory data storage device, wherein the computer is in communication with the at least one container treating device;

a plurality of reference values for each of the plurality of parameters stored on the non-transitory data storage device, wherein the reference values are numerical values derived from measurement or calculation, and relate to at least one of an energy consumption, a temperature, a distance, a heating time or a transport speed of the physical operation for treating containers;

at least one user interface of the computer, wherein at least one characteristic value of containers to be treated by the at least one container treating device is entered by a user at the at least one user interface, wherein the characteristic value corresponds to a desired physical result of the containers achieved from treatment thereof; and an automatic instruction signal output to the at least one container treating device to perform the treatment operation on the containers to achieve the entered characteristic value of the containers, wherein the automatic instruction signal is based on a combination of the plurality of parameters and the plurality of reference values to achieve the entered characteristic value.

12. The system of claim 11, wherein the plurality of parameters of physical operation for treating containers further comprise at least one of: an energy consumption, a heating temperature, a distance, a heating time, or a transport speed.

13. The system of claim 11, wherein the at least one characteristic value of containers to be treated further comprises at least one of: a container shape, a container wall thickness, or a material distribution.

14. The system of claim 11, wherein the combination of the plurality of parameters and the plurality of reference values is calculated with an arithmetic unit of the computer.

15. The system of claim 11, wherein during performance of the treatment operation of the containers, at least one of the plurality of reference values is measured.

16. The system of claim 15, wherein the measured at least one of the plurality of reference values is a fixed reference value.

17. The system of claim 11, wherein for at least one parameter of the plurality of parameters, at least one of an upper limit or a lower limit is specified for a reference values.

18. The system of claim 11, wherein the containers further comprise at least one of: preforms, bottles, cans, KEGS, syringes, or pouches.

19. The system of claim 11, wherein the containers are constructed from at least one of: plastic, glass, or metal.

20. The system of claim 11, wherein the at least one container treating device further comprises at least one of: a heating device, a forming device, a transport device, a drive device, a sterilizing device, a feeding device, a discharge device, or a filling device.

* * * * *